United States Patent
Kummerow et al.

(10) Patent No.: US 7,655,339 B1
(45) Date of Patent: *Feb. 2, 2010

(54) MOLDED FUEL CELL PLATES WITH SEALS

(75) Inventors: Jack A. C. Kummerow, Paris, TN (US); Joe B. Darke, Dover, TN (US); David C. Alsip, Paris, TN (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 992 days.

This patent is subject to a terminal disclaimer.

(21) Appl. No.: 10/652,707

(22) Filed: Aug. 29, 2003

Related U.S. Application Data

(63) Continuation-in-part of application No. 10/456,228, filed on Jun. 6, 2003, now Pat. No. 7,432,007.

(51) Int. Cl.
- H01M 2/08 (2006.01)
- H01M 2/14 (2006.01)
- H01M 2/00 (2006.01)

(52) U.S. Cl. ............... 429/35; 429/36; 429/38; 429/39; 429/34; 29/623.2; 29/623.1

(58) Field of Classification Search ............... 429/35, 429/36, 38, 39, 34; 29/623.2, 623.1
See application file for complete search history.

(56) References Cited

U.S. PATENT DOCUMENTS

| | | | |
|---|---|---|---|
| 4,685,900 A * | 8/1987 | Honard et al. | 604/6.09 |
| 5,034,288 A | 7/1991 | Bossel | |
| 5,176,966 A | 1/1993 | Epp et al. | |
| 5,284,718 A * | 2/1994 | Chow et al. | 429/26 |
| 5,496,655 A | 3/1996 | Lessing | |
| 5,976,726 A * | 11/1999 | Wilkinson et al. | 429/35 |
| 6,057,054 A | 5/2000 | Barton et al. | |
| 6,165,634 A * | 12/2000 | Krasij et al. | 429/35 |
| 6,231,053 B1 * | 5/2001 | Wakamatsu | 277/628 |
| 6,337,120 B1 * | 1/2002 | Sasaki et al. | 428/66.4 |
| 6,338,492 B1 | 1/2002 | Schilling et al. | |
| 6,451,469 B1 * | 9/2002 | Nakamura et al. | 429/36 |
| 6,596,427 B1 * | 7/2003 | Wozniczka et al. | 429/32 |

(Continued)

FOREIGN PATENT DOCUMENTS

EP   1009052 A1   6/2000

(Continued)

*Primary Examiner*—Patrick Ryan
*Assistant Examiner*—Angela Martin
(74) *Attorney, Agent, or Firm*—Marshall & Melhorn, LLC

(57) ABSTRACT

A fuel cell unit incorporates a pair of plates; one plate an anode, the other a cathode. Respective anode and cathode plates are physically bonded together to form such pairs; wherein pluralities of the pairs are secured together to form commercially available fuel cells utilized to generate electric power. Material employed between respective pairs of plates are in the nature of resilient media arranged about selected areas of the plates to confine paths for fluids adapted to flow within said selected areas. A method of manufacturing such fuel cell units involves the injection of a rapidly curable liquid silicone material into aligned apertures of the respective plates, whereby liquid silicone material flows through and between the plates to a) seal between respective anode and cathode plates and to b) form an insulation layer on the backside of the anode.

9 Claims, 4 Drawing Sheets

| U.S. PATENT DOCUMENTS | | | |
|---|---|---|---|
| 6,599,650 B2 * | 7/2003 | Wu et al. | 429/26 |
| 7,070,876 B2 * | 7/2006 | Artibise et al. | 429/34 |
| 2001/0019791 A1 * | 9/2001 | Gooch et al. | 429/36 |
| 2005/0202296 A1 * | 9/2005 | Aisenbrey | 429/27 |

FOREIGN PATENT DOCUMENTS

| EP | 1083616 A2 | 3/2001 |
|---|---|---|
| EP | 02253240 | 9/2002 |
| JP | 2001-332275 * | 11/2001 |
| WO | WO 00/35038 | 6/2000 |

* cited by examiner

MOLDED FUEL CELL PLATES WITH SEALS

CROSS REFERENCE TO RELATED APPLICATION

This application is a continuation-in-part of application Ser. No. 10/456,228, filed Jun. 6, 2003 which is a continuation of application Ser. No. 09/858,165, filed May 15, 2001, now U.S. Pat. No. 6,599,653, the entire contents of which are herein incorporated by reference in its entirety.

FIELD OF INVENTION

The present invention relates to improved fuel cell assemblies for generating electric power, and more particularly to a method for providing resilient media between individual fuel cell plates and an insulation layer between fuel cell units.

BACKGROUND OF THE INVENTION

It is known to apply resilient sealing beads to and between the faces of fuel cell plates for controlling fluid flows between pluralities of such plates, stacked in pairs and bolted together for generating electric power. In a typical fuel cell stack arrangement, the pluralities of such plates are sandwiched together in a parallel, face-to-face pattern. The plates are held spaced apart by resilient sealing beads typically adhesively bonded to the face of at least one of any two adjoining plates. The sealing beads fit within grooves on the faces of the plates, and define paths or channels for fluids to flow between the plates. Normally, the fluids include not only fluid electrolytes used for generation of energy, but also coolants as will be appreciated by those skilled in the art.

The fuel cell plates employed in the usual fuel cell stack are normally formed of plastic composites that include graphite. The sealing beads are formed of an elastomeric material. The beads are normally adhesively applied to the plates by a bonding agent, although in some cases the beads are simply held in place by pressure of compression created by bolted connections between plates. Each fuel cell unit is comprised of a cathode and an anode plate. Between each cathode and anode plate of each cell flows a coolant material of either glycol-based anti-freeze or deionized water. Between each fuel cell unit flows two chemically reactive elements, hydrogen and oxygen, separated by a catalytic membrane. The hydrogen and oxygen elements react at the membrane to form water vapor in a type of reverse electrolysis.

The nature of the chemical reaction, along with a need for separation of the coolant from the reacting elements, occasionally requires that extreme or costly measures be taken to avoid leakage through or between the plates. Thus, an improved mechanism is needed to assure against leakage between adjacent fuel cell plates, one that is highly reliable, particularly in mass production manufacturing environments.

SUMMARY OF THE INVENTION

A fuel cell apparatus includes a plurality of individual fuel cell units, each including at least two facing, parallel plates, mated together. A resilient sealing media, preferably formed of an elastomeric material, is employed to seal the plates together. The sealing media may be applied in the form of a curable fluid sealing material, which after being cured in place, is adapted to facilitate control of fluid flows, such as coolants between the plates, and of electrolyte flows between fuel cells. Upon completion of manufacture, a plurality of such parallel, stacked plates that incorporate the present invention are separated by a plurality of discrete resilient sealing beads disposed over selective portions of the surfaces of the two facing plates.

The invention involves the manufacture of fuel cell units, each unit defined by a pair of plates comprising an anode and a cathode plate, in which the cathode plate and the anode plate are sealingly bonded together. Pluralities of such fuel cell units are stacked and secured together to form commercially available composite fuel cell structures utilized to generate electric power, either domestically (i.e. for home use) or for use in vehicles.

Specifically, an electrolytic fuel cell unit comprises at least a first plate and a second plate having opposing surfaces generally facing each other. The first and second plates each have at least one aperture substantially in registration with the other. The fuel cell unit further includes a first resilient media having a portion thereof disposed between the first and second plates. Further, a second resilient media is disposed on either the first or second plate. A portion of the second resilient media extends through the apertures to bond the plates together and compresses the portion of the first resilient media between the first and second plates.

The invention offers two alternative methods for manufacturing sealed pairs of fuel cell plates in a simple and efficient manner. The first method employed involves the injection of a curable liquid silicone into an aligned mold aperture of one of the mated plates, whereby liquid silicone flows via the apertures through the other plate, as well as between the plates in order to establish a seal between the plates. Moreover, the liquid silicone is injected into aligned apertures of cathode and anode plates, flows entirely through both plates, as well as between the plates, and forms an insulation layer on the backside of the bottom plate. In the preferred embodiment described herein, the bottom plate is the anode. Further, grooves on mating surfaces of the plates include at least one projection, whereby the projection is destroyed when the cured fuel cell plates are compressed in a mold. Accordingly, the cured liquid silicone between the plates is compressed to form a more effective seal.

The second alternative method of manufacturing sealed fuel cell plates includes first aligning a first plate, an anode, into a mold. Liquid silicone is injected through the aperture of the anode to dispose media on both surfaces of the anode. Media on one surface of the anode being an insulation layer. The liquid silicone disposed on the anode cures, then a second plate, or cathode is aligned in a mold such that second apertures of each plate are generally aligned. The plates are compressed and liquid silicone is injected through the second aperture. Media is disposed on outer surfaces of the first and second plates and within the aligned second apertures.

DETAILED DESCRIPTION OF THE PREFERRED EMBODIMENTS

Figure 1:
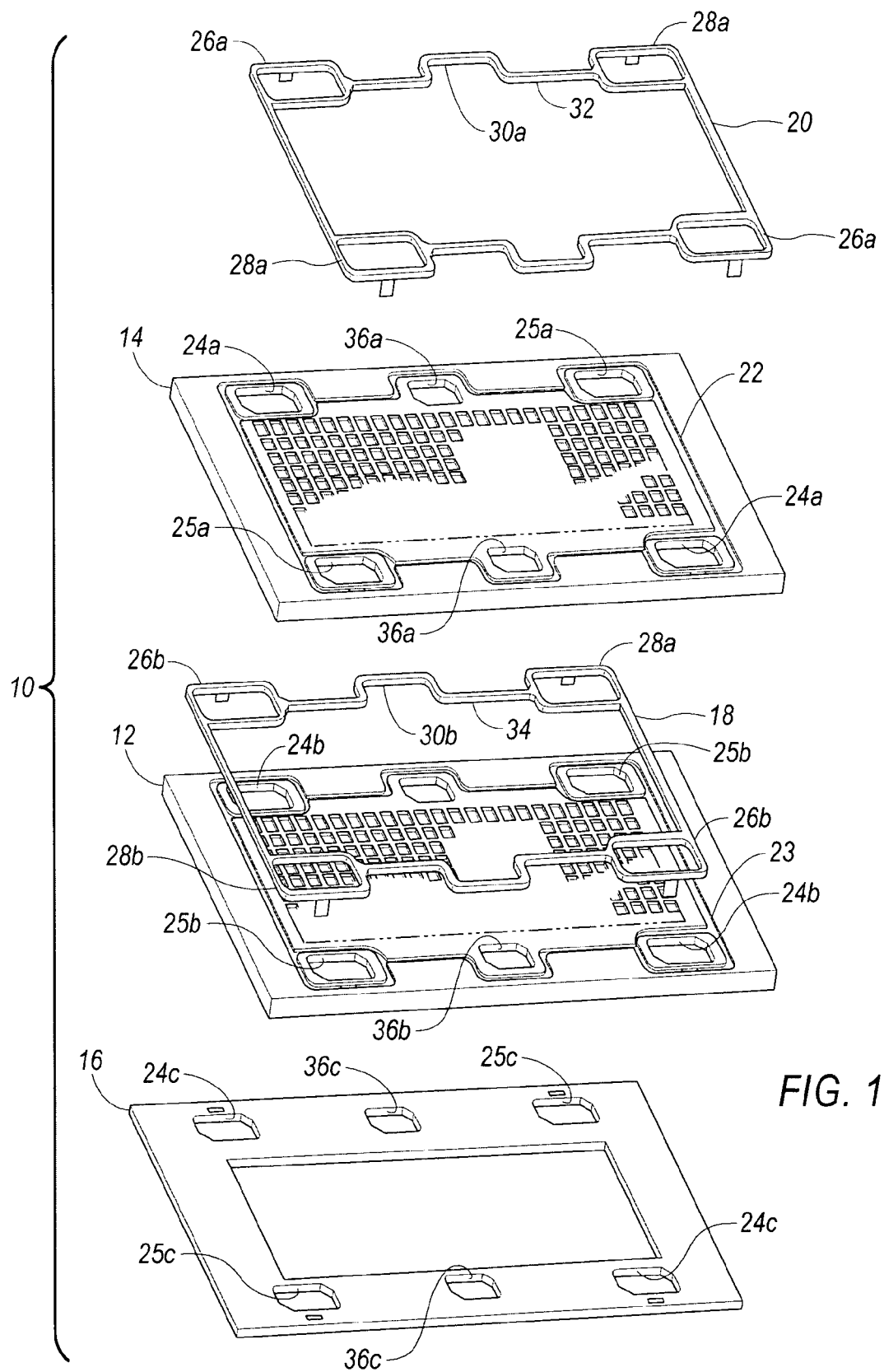
FIG. 1 is an exploded view of a fuel cell unit according to a first embodiment of the type described in the present invention, including anode and cathode plates along with seals adapted for interposition between plates within grooves on the plate faces, and including an insulation layer on the backside of the anode.
Figure 2:
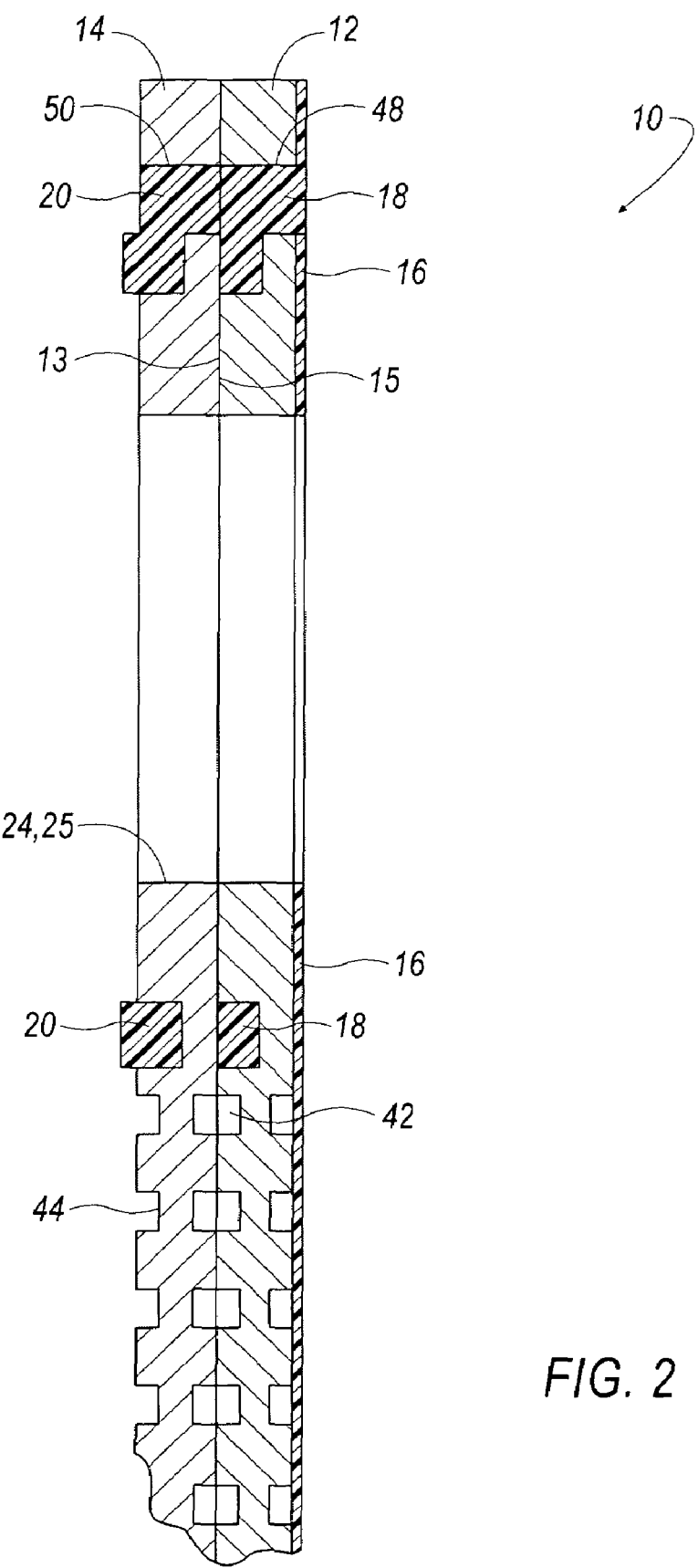
FIG. 2 is a fragmentary cross-sectional view of an assembled molded and sealed fuel cell unit of FIG. 1, taken through an aperture at a corner of an assembled rectangular unit constructed in accordance with the present invention.

Referring to FIGS. 1 and 2, an electrolytic fuel cell unit 10 is shown, which includes an anode plate 12 and a cathode plate 14. Stacks of such fuel cell units 10 are assembled together to provide composite fuel cell structures (not shown) to generate electric power. In such a stack, an insulation layer 16 is interposed between each fuel cell unit 10.

First and second resilient media 18, 20, or gaskets, are interposed between each fuel cell unit 10, as well as between each plate 12, 14. Although the media 18, 20 are shown separately in FIG. 1, one embodiment of this invention provides a means by which the media 18, 20 are integrally connected in one single, contiguous mass of material as described below. In another embodiment of the invention, the insulation layer 16 is integrally formed with the first resilient media 18. The insulation layer 16 is preferably and generally thicker than the media 18, 20 in both embodiments.

Each of the media 18, 20 is accommodated by a respective groove 22 in the cathode plate 14, and a groove 23 in the anode plate 12. The media 18, 20 are received in the grooves 22, 23 and are contiguous so as to define interior perimeters 32 and 34, respectively, adapted to accommodate either a coolant or a fuel component.

Figure 3:
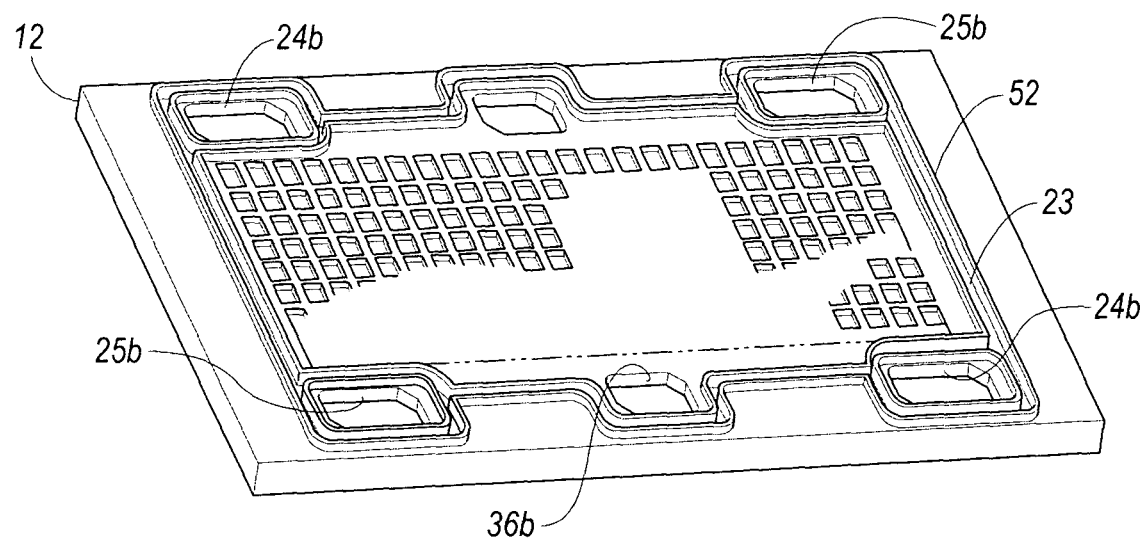
FIG. 3 is a perspective view of an anode plate including the presence of projections at the groove boundaries.
Figure 4:
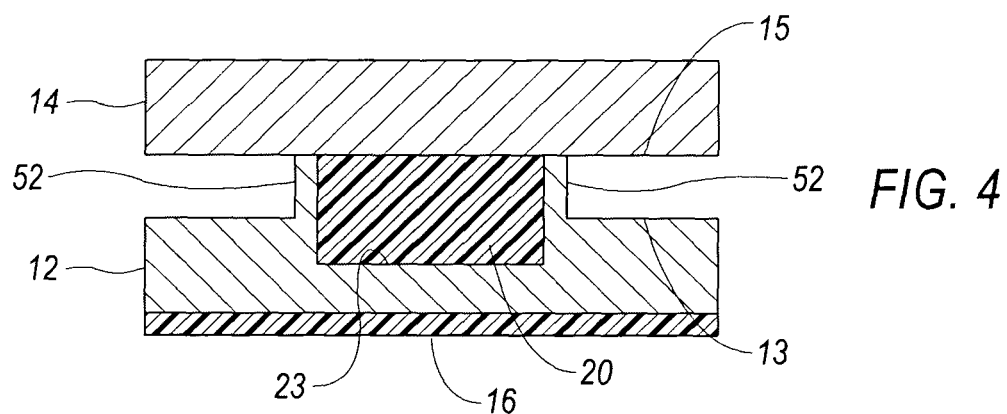
FIG. 4 is a cross-sectional view of the assembled molded and sealed fuel cell unit utilizing the anode plate shown in FIG. 3 prior to applying additional pressure to remove the projections at the boundaries of the grooves.

In one embodiment of the invention, the grooves 23 of the anode 12 include projections 52 extending from the surface of the anode 12 as shown in FIGS. 3 and 4. The projections 52 are preferably formed of the same material as the anode 12. The projections 52 increase the depth of grooves 23 to receive more resilient media 20, thus forming a more efficient seal between the anode 12 and cathode 14 once the plates 12, 14 are compressed and the projections 52 are removed. Placing the projections 52 on one or both grooves 22, 23 of mating, parallel faces 13, 15 of the anode 12 and cathode 14 are contemplated by the present invention. The projections 52 are preferably positioned along the outer boundaries of the grooves 23, as best seen in FIG. 3.

Referring now to FIGS. 1 and 2, fuel apertures 24 accommodate the admission and flow of hydrogen into the anode 12. The anode 12 includes a series of grooves 46 for this purpose. Conversely, the cathode 14 includes a series of grooves 44, which accommodate the admission and flow of oxygen.

Within the respective plates 12 and 14, the fuel apertures 24, 25 are shown as 25a and 25b, and 24a and 24b, respectively. In the insulation layer 16 the fuel apertures 24, 25 are shown as 24c and 25c. In the structures of the first and second resilient media 18 and 20, fuel apertures for hydrogen are shown as fully circumferential apertures 26A and 26B, while fuel apertures for oxygen are depicted as fully circumferential apertures 28A and 28B. It will be noted that the respective oxygen and hydrogen apertures accommodate a cross flow over the plate reaction area 38, to the extent that the apertures are diametrically opposed from each other within the rectangular plates 14 and 12.

It will be appreciated by those skilled in the art that chemical reactions in the nature of a reverse electrolysis takes place within a fuel cell unit 10. The reactions are created by the contact between the fuel components of oxygen and hydrogen, and enhanced by a catalytic membrane (not shown) positioned between adjacent stacked fuel cell units 10. Thus, such reactions take place only between the fuel cell units 10. Referring now particularly to FIG. 2, spaced areas between each of the mating, parallel faces 13 and 15 of each of the pairs of anodes 12 and cathodes 14, respectively, are defined by inter-plate coolant grooves 42. Primary fuel cell cooling thus takes place between each of the mated plates 12 and 14 of each fuel cell unit 10.

Referring now particularly to FIG. 1, coolant ports 36 admit coolant into the coolant grooves 42 between the plates 12 and 14. The ports 36 are shown respectively as 36a and 36b in the plates 14 and 12, and as 36c in the insulation layer 16. It is preferred that the coolant ports 36 are arranged to be medially located within the plates 12, 14 and substantially aligned with each other for optimal benefit, as those skilled in the art will fully appreciate. For this purpose, it will be noted that the resilient media 18 and 20 contain portions 30a and 30b designed as c-shaped portions to promote flows of coolant within their contiguous interior perimeter boundaries 32 and 34, respectively.

One method of manufacturing the fuel cell unit 10 of the present invention will now be described. Referring specifically to FIG. 2, it will be noted that the respective resilient media 18, 20, as well as the insulation layer 16 of FIG. 1, are all formed as a unitary, contiguous mass of material. This approach avoids the need to form separate insulation layer 16 and resilient media 18, 20 of FIG. 1, and thus reduces costs of manufacture. As earlier noted, the media 18, 20 and insulation layer 16 are preferably formed of an elastomeric material. For this purpose, a liquid silicone material may be injected under pressure through aligned apertures 48, 50, which pass respectively through the anode 12 and the cathode 14, as shown in FIG. 2. The apertures 48, 50 are preferably positioned within the grooves 22, 23 of the anode 12 and the cathode 14, respectively, such that the silicon material can travel along and completely fill the grooves 22, 23.

The respective anode and cathode plates 12, 14 are placed within a mold (not shown) with the anode 12 spaced from a floor of the mold. The mating parallel faces 13, 15 of the plates 12, 14 are maintained in a spaced relationship because of the projections 52. Liquid silicone material is then forced through the apertures 48, 50 initially through the cathode 14 at a pressure of between about 300-700 lbs/in$^2$ which is sufficient to force the liquid silicone material through and between the plates 12, 14, including the space between the bottom plate (anode 12) and the bottom or floor of the mold. Then the liquid silicone material is allowed to cure, typically within approximately two minutes at a temperature of between about 75-400 degrees Fahrenheit.

Figure 5:
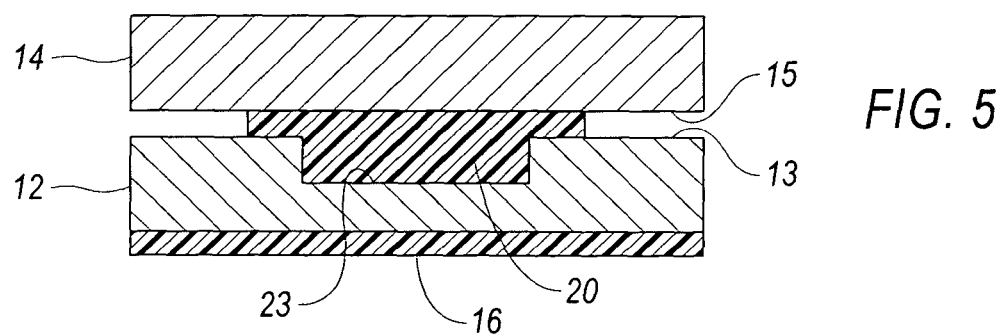
FIG. 5 is a cross-sectional view of the assembled molded and sealed fuel cell unit under compression after applying additional pressure to remove the projections at the boundaries of the grooves as seen in FIG. 4.

The cured fuel cell unit 10 is then transferred to a second mold (not shown). The second mold compresses the unit 10 at a pressure greater than the first mold. The greater pressure removes the projections 52 and presses the cathode 14 closer to the anode 12 as shown in FIG. 5. The resilient media 18 positioned between the plates 12, 14 is compressed to form a more effective seal as compared to conventional fuel cell units.

Figure 6:
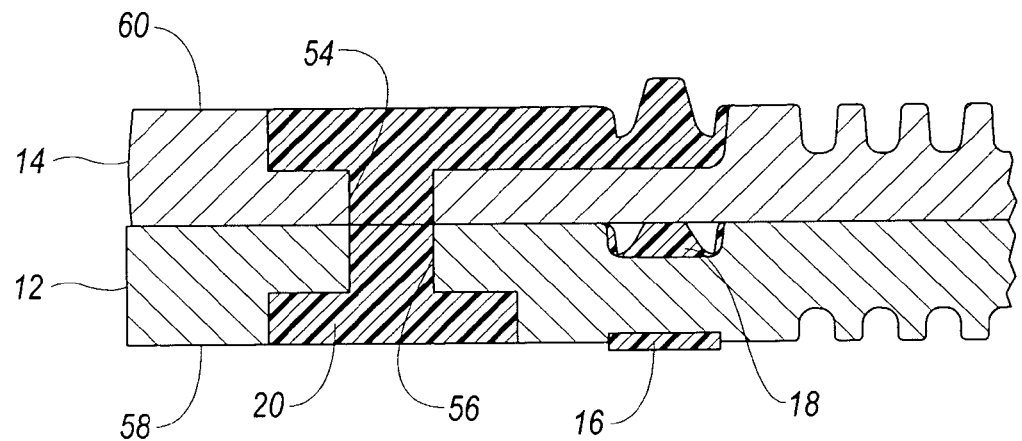
FIG. 6 is a cross-sectional view of an assembled molded and sealed fuel cell unit of a second embodiment of the present invention.
Figure 7:
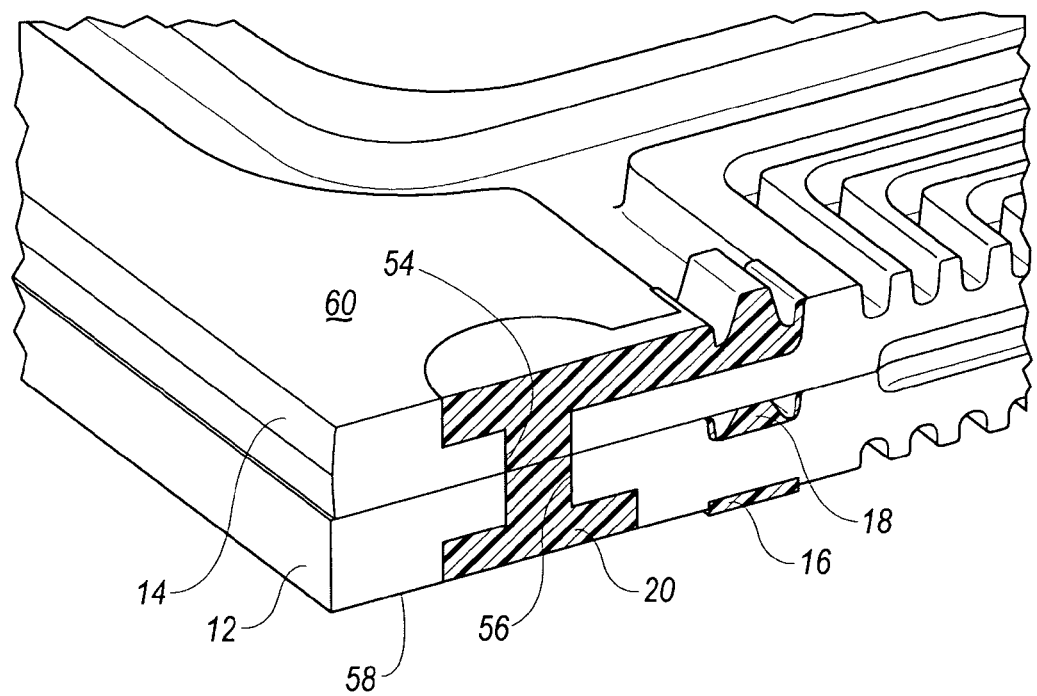
FIG. 7 is a perspective view of the assembled molded and sealed fuel cell unit of the second embodiment of FIG. 6.

Referring to FIGS. 6-7, as an alternative to using projections 52 in the first method of the invention, a more effective seal may be generated by utilizing a two-step molding process. First, the anode 12 is placed in a mold (not shown) and liquid silicone material is injected through the aperture 48 and into the groove 23. The liquid silicone material is disposed on both surfaces of the anode 12 to form the first resilient media 18 and the insulation layer 16. Once the first resilient media 18 has cured, an aperture 54 formed in the cathode 14 is aligned in the mold (not shown) with an aperture 56 formed in the anode 12. The apertures 54, 56 are preferably located outside the grooves 22, 23 and are generally larger in diameter than the apertures 48, 50. Then, the cathode 14, the anode 12 and the first resilient media 18 are compressed while liquid silicone material is again injected into the mold. The liquid silicone material is positioned on outer surfaces 58, 60 of the plates 12, 14 and within the second apertures 54, 56. The liquid silicone material is allowed to cure to form the second resilient media 20 while the plates 12, 14 remain compressed to form a more effective seal with resilient media 18. The temperatures and pressures of the two-step embodiment may be substantially identical as the temperatures and pressures of the first process described above.

Accordingly, each alternative method of manufacture produces a fuel cell unit 10 having a more effective seal than conventional fuel cell units because of the compression of the first resilient media 18 between the anode 12 and the cathode.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. An electrolytic fuel cell unit comprising:
   an anode plate and a cathode plate, each of said anode and cathode plates having at least one aperture substantially aligned with the other to create a continuous passage entirely filled with resilient media from one plate to the other plate;
   a first resilient media having a portion thereof disposed between said plates; and
   a second resilient media disposed on one of said plates including a portion thereof extending through said apertures and said passage, said second resilient media bonding said plates together to compress said portion of said first resilient media between said plates;
   wherein at least one of said first resilient media and said second resilient media further includes at least one sealed channel such that liquid can pass there through.

2. An electrolytic fuel cell unit according to claim 1, wherein said first and said second resilient media are formed from a liquid silicone material.

3. An electrolytic fuel cell unit according to claim 1, wherein said plates each include grooves for receiving said first and said second resilient media.

4. An electrolytic fuel cell unit according to claim 3, wherein said apertures each accommodate flow of liquid resilient media into or between said second plates.

5. An electrolytic fuel cell unit according to claim 4, wherein said apertures include first apertures and second apertures and wherein said first apertures are positioned within said groove and said second apertures are positioned outside said grooves, said second apertures being generally larger than said first apertures.

6. An electrolytic fuel cell unit according to claim 5, wherein said liquid resilient media is forced under pressure into said first apertures and said second apertures to form said first resilient media and said second resilient media, respectively.

7. An electrolytic fuel cell unit according to claim 3, wherein said grooves further include at least one projection extending from one of said plates.

8. An electrolytic fuel cell unit according to claim 7, wherein said at least one projection extends along said grooves of said plates.

9. An electrolytic fuel cell unit according to claim 1, wherein a portion of said first resilient media comprises an insulation layer.

* * * * *